United States Patent
Mongillo, Jr. et al.

(10) Patent No.: US 12,050,011 B2
(45) Date of Patent: Jul. 30, 2024

(54) DILUTION HOLES WITH RIDGE FEATURE FOR GAS TURBINE ENGINES

(71) Applicant: RTX Corporation, Farmington, CT (US)

(72) Inventors: Dominic Mongillo, Jr., West Hartford, CT (US); Christopher Whitfield, Manchester, CT (US); Tracy Phropheter-Hinckley, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/466,999

(22) Filed: Sep. 3, 2021

(65) Prior Publication Data

US 2021/0396388 A1   Dec. 23, 2021

Related U.S. Application Data

(62) Division of application No. 15/725,019, filed on Oct. 4, 2017, now Pat. No. 11,137,140.

(51) Int. Cl.
| | |
|---|---|
| *F23R 3/04* | (2006.01) |
| *F02C 3/04* | (2006.01) |

(Continued)

(52) U.S. Cl.
CPC .............. *F23R 3/04* (2013.01); *F23R 3/002* (2013.01); *F23R 3/02* (2013.01); *F23R 3/06* (2013.01);

(Continued)

(58) Field of Classification Search
CPC .... F23R 3/04; F23R 3/002; F23R 3/02; F23R 3/06; F23R 2900/03041;

(Continued)

(56) References Cited

U.S. PATENT DOCUMENTS

| | | |
|---|---|---|
| 4,700,544 A | 10/1987 | Fucci |
| 4,875,339 A | 10/1989 | Rasmussen |

(Continued)

FOREIGN PATENT DOCUMENTS

| | | |
|---|---|---|
| EP | 0187731 | 7/1986 |
| EP | 1351022 | 10/2003 |

(Continued)

OTHER PUBLICATIONS

European Patent Office; European Office Action dated Mar. 28, 2022 in Application No. 18198175.4.

(Continued)

*Primary Examiner* — Arun Goyal
*Assistant Examiner* — Henry Ng
(74) *Attorney, Agent, or Firm* — SNELL & WILMER L.L.P.

(57) ABSTRACT

A grommet may define a dilution hole in a combustor panel. The grommet may comprise a ridge having a stepped geometry formed about an inner diameter of the grommet, the ridge comprising a passage. The passage may comprise an outlet. The ridge may further comprise a fillet about the inner diameter of the grommet, wherein the outlet is configured to direct a cooling flow circumferentially along the fillet and fill the ridge with the cooling flow.

8 Claims, 14 Drawing Sheets

(51) Int. Cl.
  *F23R 3/00* (2006.01)
  *F23R 3/02* (2006.01)
  *F23R 3/06* (2006.01)
(52) U.S. Cl.
  CPC ............ *F02C 3/04* (2013.01); *F05D 2220/32* (2013.01); *F05D 2240/35* (2013.01); *F05D 2250/141* (2013.01); *F23R 2900/03041* (2013.01); *F23R 2900/03042* (2013.01); *F23R 2900/03044* (2013.01)
(58) Field of Classification Search
  CPC .. F23R 2900/03042; F23R 2900/03044; F02C 3/04; F05D 2220/32; F05D 2240/35; F05D 2250/141
  See application file for complete search history.

(56) References Cited

U.S. PATENT DOCUMENTS

| | | | |
|---|---|---|---|
| 4,887,432 | A | 12/1989 | Mumford |
| 10,145,559 | B2 | 12/2018 | Gonyou |
| 10,317,079 | B2 | 6/2019 | Kostka, Jr. |
| 2012/0277660 | A1 | 11/2012 | Garrett |
| 2012/0297778 | A1 | 11/2012 | Rudrapatna et al. |
| 2013/0298564 | A1 | 11/2013 | Agarwal |
| 2014/0083112 | A1 | 3/2014 | Jause et al. |
| 2014/0216043 | A1 * | 8/2014 | Cai .................... F23R 3/002 60/755 |
| 2015/0096302 | A1 * | 4/2015 | Herborth .................. F23R 3/60 60/752 |
| 2016/0025006 | A1 | 1/2016 | Propheter-Hinckley et al. |
| 2016/0025342 | A1 | 1/2016 | Erbas-Sen et al. |
| 2016/0131363 | A1 | 5/2016 | Cunha et al. |
| 2016/0209035 | A1 | 7/2016 | Cramer |
| 2016/0238253 | A1 | 8/2016 | Moura et al. |
| 2017/0059162 | A1 | 3/2017 | Papple et al. |
| 2017/0108220 | A1 | 4/2017 | Kostka, Jr. |
| 2019/0101289 | A1 | 4/2019 | Mongillo, Jr. |

FOREIGN PATENT DOCUMENTS

| | | | |
|---|---|---|---|
| EP | 2963346 | 1/2016 | |
| EP | 3040615 | 7/2016 | |
| EP | 3182010 | 6/2017 | |
| GB | 2353589 | 2/2001 | |
| WO | 2014112992 | 7/2014 | |
| WO | WO-2015084963 A1 * | 6/2015 | ............. F23R 3/002 |
| WO | 2015147929 | 10/2015 | |
| WO | 2016114853 | 7/2016 | |

OTHER PUBLICATIONS

Dominic Mongillo, Jr. et al., U.S. Appl. No. 15/725,019, filed Oct. 4, 2017 and entitled "Dilution Holes With Ridge Feature for Gas Turbine Engines", pp. 41.
Dominic Mongillo, U.S. Appl. No. 15/654,324, filed Jul. 19, 2017 and entitled Dilution Holes for Gas Turbine, pp. 36.
European Patent Office, European Search Report dated Oct. 29, 2018 in Application No. 18181617.04.
European Patent Office, European Search Report dated Nov. 21, 2018 in Application No. 18198175.4.
USPTO, Notice of Allowance dated Jul. 3, 2019 in U.S. Appl. No. 15/654,324.
USPTO, Pre-Interview First Office Action dated Apr. 16, 2020 in U.S. Appl. No. 15/725,019.
USPTO, First Action Interview Office Action dated Jun. 11, 2020 in U.S. Appl. No. 15/725,019.
USPTO, Final Office Action dated Sep. 17, 2020 in U.S. Appl. No. 15/725,019.
European Patent Office, European Search Report dated Oct. 7, 2020 in Application No. 18198175.4.
USPTO, Advisory Action dated Nov. 24, 2020 in U.S. Appl. No. 15/725,019.
USPTO, Notice of Allowance dated Jun. 2, 2021 2021 in U.S. Appl. No. 15/725,019.
European Patent Office, European Office Action dated Dec. 16, 2022 in Application No. 18198175.4.

* cited by examiner

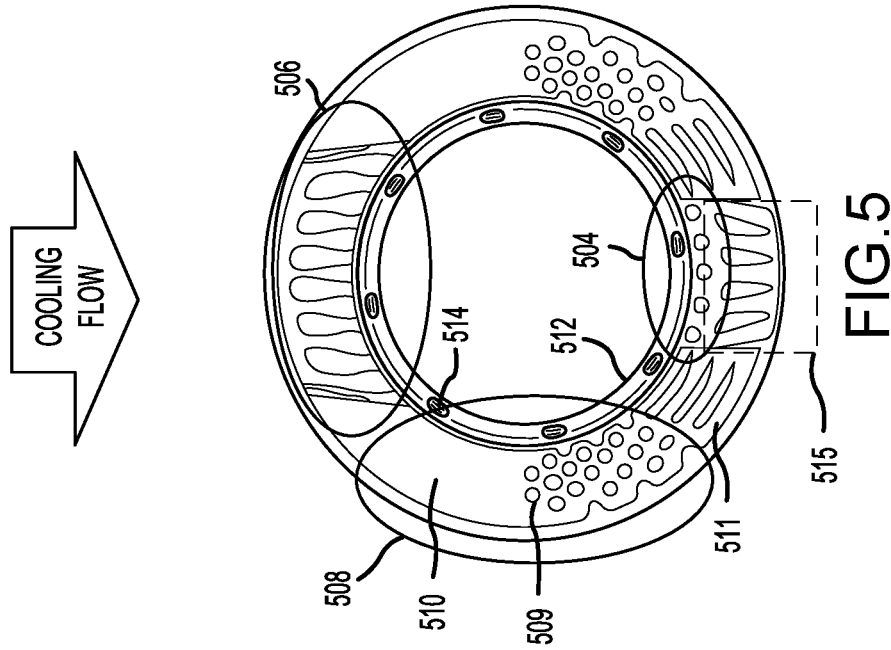
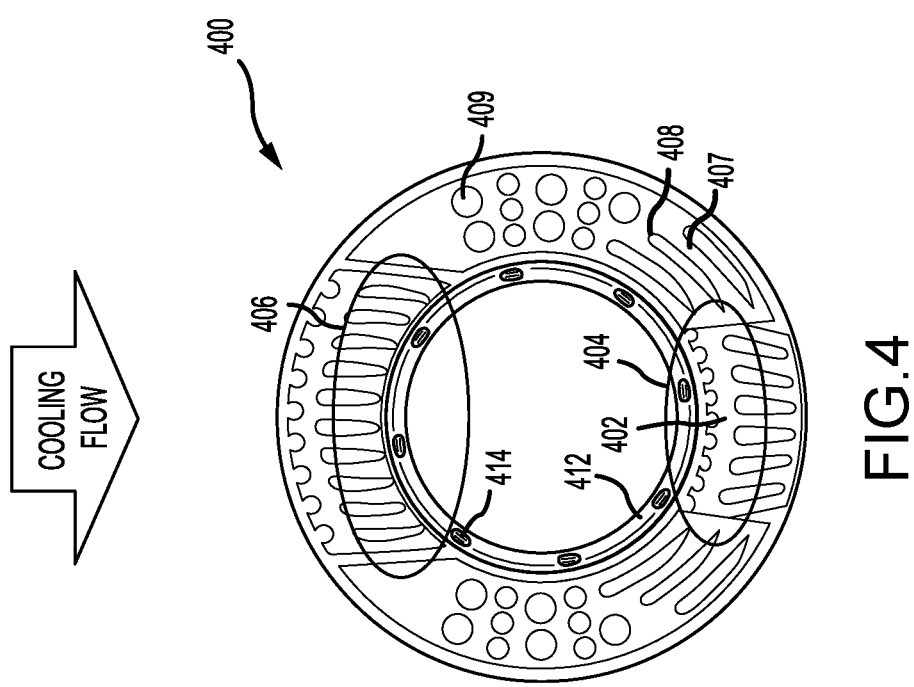

DILUTION HOLES WITH RIDGE FEATURE FOR GAS TURBINE ENGINES

CROSS-REFERENCE TO RELATED APPLICATIONS

This application is a divisional of, and claims priority to, and the benefit of, U.S. application Ser. No. 15/725,019 filed Oct. 4, 2017 and entitled "DILUTION HOLES WITH RIDGE FEATURE FOR GAS TURBINE ENGINES," which is incorporated by reference herein in its entirety for all purposes.

FIELD

The disclosure relates generally to dilution holes in gas turbine engines.

BACKGROUND

Combustor temperatures in gas turbine engines can reach extreme heights. The air temperature in a combustor often exceeds the melting point of the combustor liner. Combustors often have "dilution holes" in the liner. Dilution holes allow combustors to operate at conditions that minimize emissions generated during the combustion process. In addition, dilution holes promote mixing within the combustion chamber, which serves to condition the flow entering the turbine. Combustion dilution holes are often disposed at locations that are difficult to cool. The dilution holes may also have separations within the dilution holes that tend to entrain hot gas produce and localized hot spots. The hot spots can damage the dilution holes themselves, as well as the surrounding combustor liner.

SUMMARY

A grommet having at least one of an annual geometry or an elliptical geometry defining a dilution hole is provided according to various embodiments. The grommet may comprise a ridge having a step geometry comprising at least one of a sharp geometry, a radial geometry, or a multi-radial geometry, the ridge formed about an inner diameter of the grommet and comprising a passage. In various embodiments, the passage comprises an outlet. In various embodiments, the ridge comprises a fillet about the inner diameter of the grommet, wherein the outlet is configured to direct a cooling flow circumferentially along the fillet and fill the ridge with the cooling flow. In various embodiments, the ridge further comprises a step and the outlet opens through one of the step or the fillet.

In various embodiments, the ridge further comprises a fillet about the inner diameter of the grommet, wherein the outlet is configured to direct a cooling flow radially inward of the fillet and the ridge toward the dilution hole. In various embodiments, the ridge further comprises a step and the outlet opens through one of the step or the fillet. In various embodiments, the ridge comprises a trench. In various embodiments, the grommet further comprises a bell-mouth comprising a fillet, wherein the inlet opens through one of the bell-mouth or the fillet. In various embodiments, the passage spirals through a solid portion of the ridge circumferentially about the dilution hole. In various embodiments, the passage passes through a solid portion of the ridge substantially parallel to an axis of the dilution hole.

A combustor liner is also provided according to various embodiments. The combustor liner includes an array of cooling holes and a grommet formed integrally with the combustor liner. The grommet having at least one of an annular geometry or an elliptical geometry defines an area around the perimeter of a dilution holes. The grommet may include a ridge having a step geometry comprising at least one of a sharp geometry, a radial geometry, or a multi-radial geometry, the ridge formed about an inner diameter of the grommet and may comprise a passage.

In various embodiments, the passage comprises an outlet. In various embodiments, the ridge further comprises at least one of a trench or a fillet about the inner diameter of the grommet, wherein the outlet is configured to direct a cooling flow circumferentially along at least one of the fillet or the trench and fill the ridge with the cooling flow. In various embodiments, the ridge further comprises a fillet about the inner diameter of the grommet, wherein the outlet is configured to direct a cooling flow radially inward of the fillet and the ridge toward the dilution hole.

A gas turbine engine is further provided according to various embodiments. The gas turbine engine may include a compressor section configured to compress a gas, a combustor section aft of the compressor section and configured to combust the gas, and a turbine section aft of the combustor section and configured to extract energy from the combusted gas. The combustor section may include a combustor liner having a grommet formed integrally with the combustor liner having at least one of an annular geometry or an elliptical geometry. The grommet may define a dilution hole. The grommet may include a ridge having a step geometry comprising at least one of a sharp geometry, a radial geometry, or a multi-radial geometry, the ridge formed about an inner diameter of the grommet and comprising a passage.

In various embodiments, the passage comprises an outlet. In various embodiments, the ridge further comprises at least one of a trench or a fillet about the inner diameter of the grommet, wherein the outlet is configured to direct a cooling flow circumferentially along at least one of the fillet or the trench and fill the ridge with the cooling flow. In various embodiments, the ridge further comprises a fillet about the inner diameter of the grommet, wherein the outlet is configured to direct a cooling flow radially inward of the fillet and the ridge toward the dilution hole. In various embodiments, the passage spirals through a solid portion of the ridge circumferentially about the dilution hole. In various embodiments, the passage passes through a solid portion of the ridge substantially parallel to an axis of the dilution hole.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3F-1 illustrates a section through a grommet defining a dilution hole and having internally defined cooling features, in accordance with various embodiments;

FIG. 3F-2 illustrates a section through a grommet defining a dilution hole and having internally defined cooling features, in accordance with various embodiments;

FIG. 3G-1 illustrates a section through a grommet defining a dilution hole and having internally defined cooling features and a trench feature, in accordance with various embodiments;

FIG. 4 illustrates a grommet defining a dilution hole and having improved cooling efficiency, in accordance with various embodiments;

FIG. 5 illustrates a grommet defining a dilution hole and having improved cooling efficiency, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
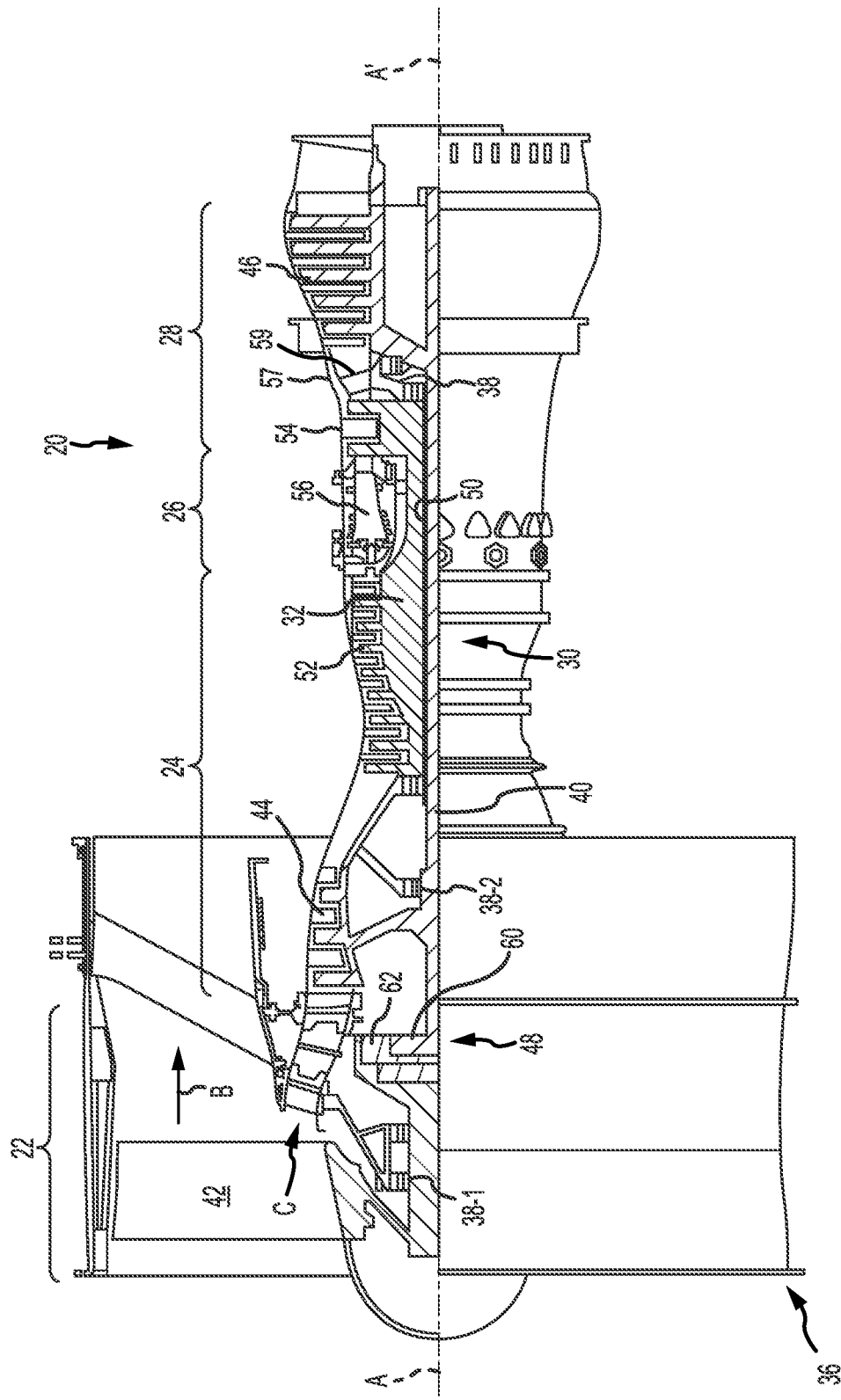
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Figure 2:
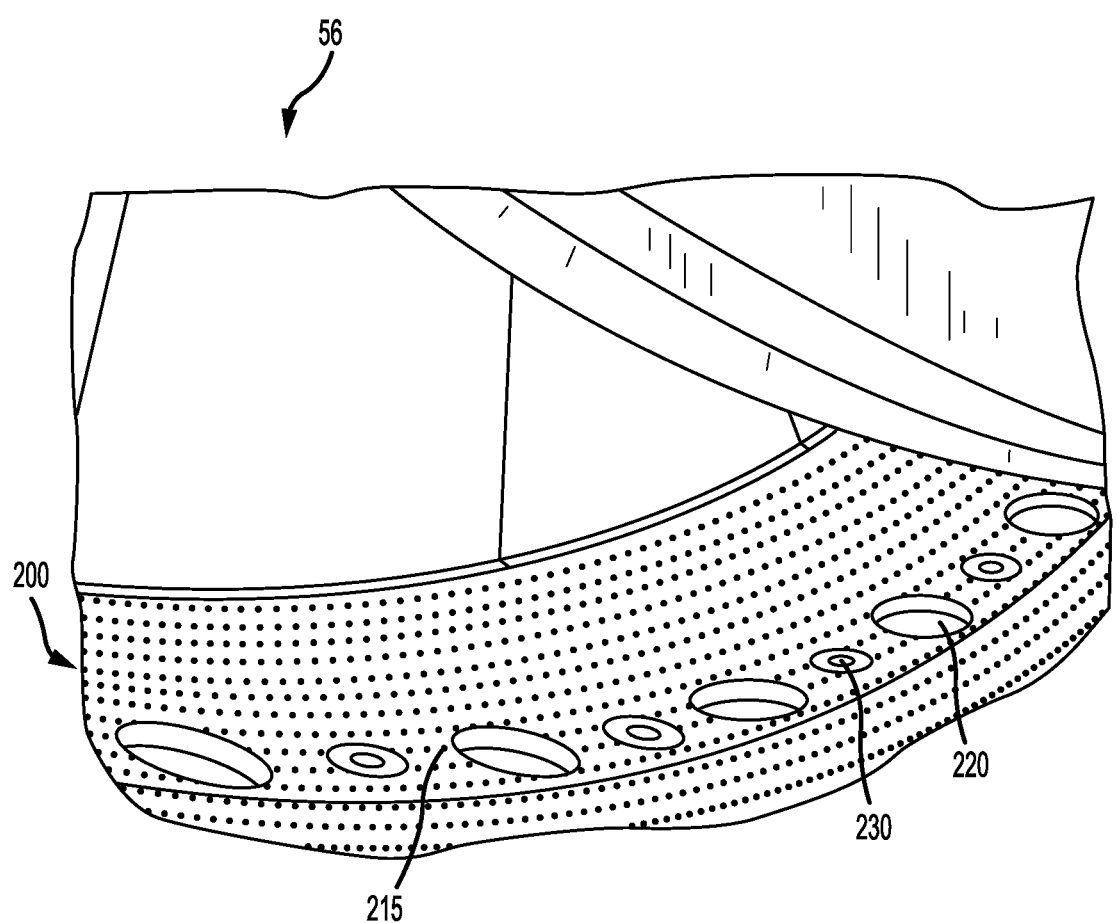
FIG. 2 illustrates a combustor having dilution holes formed through a liner, in accordance with various embodiments.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with reference to FIG. 2, the systems and apparatus disclosed herein may be configured to reduce the local temperatures in and about dilution holes 220. Dilution holes 220 having an annular or elliptical geometry may be formed integrally with, bonded to, or otherwise disposed in combustor liner 200. Dilution holes 220 are used to introduce additional compressed air into the combustion chamber. This tends to ensure that the gas has combusted with in the chamber and dilutes or distributes combusted gases around the combustor prior to entering the turbine. Dilution holes 220 thereby tend to prevent combustion within the turbine and tend to provide sufficient mixing of combustion gases that tends to reduce the temperature of hot streaks within the turbine. Dilution holes 220 or trim holes 230 may be distributed on a surface such as, for example, a combustor liner to optimize combustion and reduce peak combustion temperatures for emissions purposes in zones within the combustor. As used herein, dilution holes 220, which may be defined by an inner diameter of a grommet such as, for example, grommet 300 illustrated in FIG. 3A, or trim holes 230, which may be defined by the diameter of a tool bit, may refer to apertures in which a flow of air is introduced that becomes part of the combustion process. The air flow through cooling holes 215, dilution holes 220, and/or trim holes 230 may be directed through internal cavities and across internal cooling features prior to exiting dilution hole 220 and/or trim hole 230. High temperatures can be present in the vicinity of the dilution 220 and trim 230 holes. Uncombusted gasses which are introduced to air exiting the dilution 220 and trim 230 holes can also increase the temperatures at such locations. These increased temperatures may increase thermal strain and may lead to premature oxidization of the areas surrounding the dilution 220 and trim 230 holes. Dilution holes 220 may have cooling features arranged to provide internal cooling and film cooling. The features may be arranged to limit thermal distress that may occur in the region near dilution holes 220.

Referring now to FIGS. 3A-3D, a grommet 300 having internal cooling features is shown with an inner diameter of grommet 300 defining a dilution hole 220 of FIG. 2, in accordance with various embodiments. Grommet 300 is illustrated in FIGS. 3A-3D with transparent surfaces to show the location and geometry of internal cooling features and passages. Grommets 300 are disposed within, formed integrally with, and/or or coupled to combustor liner 200 of FIG. 2 to define dilution holes 220. Grommet 300 may have an inner diameter of about ⅛ inch (3 mm) to 1 inch (25 mm), ¼ inch (6 mm) to 1 inch (25 mm), ½ inch (13 mm) to 1 inch (25 mm), ¾ inch (19 mm) to 1 inch (25 mm) where about in this context only means±1/16 inch (1.5 mm), for example. The outer diameter of grommet 300 may be defined by the boundaries of the internal cooling features 304, and may have a diameter of approximately ¼ inch (6 mm) to 1.5 inches (38 mm), ½ inch (13 mm) to 1.5 inches (38 mm), ¾ inch (19 mm) to 1.5 inches (38 mm), or 1 inch (25 mm) to 1.5 inches (38 mm) where about in this context only means±1/16 inch (1.5 mm), for example. Grommet 300 may also have a thickness in the axial direction of the dilution hole 220 that approximates the thickness of combustor liner 200 in FIG. 2, which may be on the order of about 100 thousandths of an inch (2.5 mm) to 500 thousandths of an inch (1 cm) or 200 thousandths of an inch (5 mm) 500 thousandths of an inch (1 cm) where about in this context only means±1/16 inch (1.5 mm), for example. In various embodiments, grommet 300 may be as thick as is suitable for cooling. For example, the thickness of a grommet described herein may include the thickness of a shell, a void between the liner and shell, and/or the liner. The grommet may also protrude into the cold air chamber from which cooling passages within the dilution hole extract cooling air.

In various embodiments, grommet 300 may include internal cooling features, inlet feed ports, and exhaust ports to improve thermal properties of an engine component (e.g., combustor liner 200 of FIG. 2). Examples of internal cooling features of grommet 300 include internal convective cooling passages, heat transfer augmentation features, stepped inner diameter dilution hole cooling, and other cooling features as described below.

In various embodiments, grommet 300 may comprise various sets of cooling features including upstream cooling features 302, perimeter cooling features 312, downstream cooling features 322, and inner diameter cooling features. Upstream cooling features 302 may generally be oriented towards the incoming cooling flow. Cooling flow 301 may enter passages 306 of upstream cooling features 302 at inlet 310. Cooling flow 301 entering inlet 310 may pass across internal cooling features 304 formed along the boundaries of passages 306. Internal cooling features 304 may include pedestals, turbulators, trip strips, contoured surfaces, vascular lattice cooling, or other heat transfer augmentation features to increase heat transfer and/or generate turbulent coolant flow across upstream cooling features 302. Additionally, and with brief reference to FIG. 3E, internal cooling features 302, 312 and 322 may be in fluid communication with bell-mouth inlets 309. Bell-mouth inlet 309 may comprise a plurality of inlets defined in a surface of grommet 300 and extending substantially about the inner diameter of grommet 300.

In various embodiments, passages 306 may extend in a circumferential direction about inner diameter of grommet 300 and open to outlet geometry features 308 which may comprise discrete holes, discrete slots, and/or continuous slot geometries which may be expanded in a predominately lateral direction relative to the streamwise flow direction. Outlet geometry features 308 may eject coolant in in discrete cylindrical, conical, or elliptical film cooling hole shapes, and/or thru diffused expanded single or multi-lobe hole geometry shapes or slots tending to provide a discrete jet or a continuous insulating boundary layer of film coolant flow which tends to reduce locally high external hot gas path heat flux. Although additive manufacturing is disclosed herein as a suitable technique for making grommet 300, other techniques may also be used. Other examples of suitable techniques for making grommet 300 may include casting, additively manufacturing die and/or core, direct metal additive manufacturing, lost wax casting, or other suitable techniques.

In various embodiments, passages 306 may comprise variable length micro-channels 307 which tend to maximize internal convective surface area. Grommet 300 is shown with many passages 306 extending radially and internal cooling features 304 formed internally, and may result in relatively large internal pressure loss in exchange for enhanced cooling capacity, i.e., the enhanced ability to remove heat per unit time. Internal pressure loss, heat transfer augmentation, and cooling heat pickup may be tailored based on local external heat flux and outflow margin requirements by adding, removing, moving, resizing, or otherwise modifying passages 306 and/or internal cooling features 304.

In various embodiments, grommet 300 may comprise perimeter cooling features 312 similar to upstream cooling features 302 and located about grommet 300 between upstream cooling features 302 and downstream cooling features 322. Perimeter cooling features 312 may include internal cooling features 314 formed prior to exit passages 316. Internal cooling features 314 may be similar to internal cooling features 304, and passages 316 may be similar to passages 306, with varied lengths, sizes, contours, hydraulic diameters, or other dimensions. Passages 316 may intake the cooling flow 301 at inlet 320.

Figure 3B:
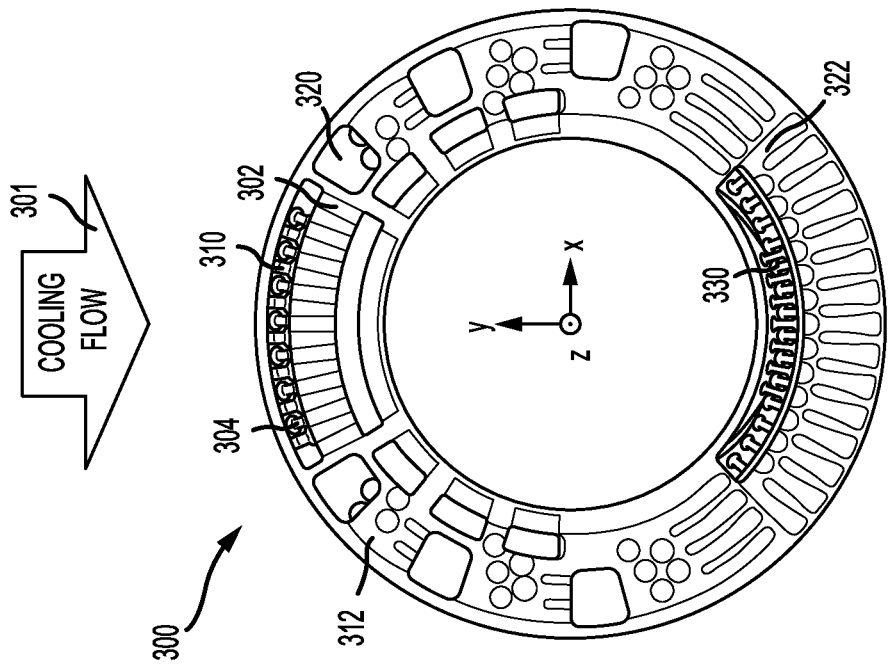
FIG. 3B illustrates a bottom view of cold side of a grommet defining a dilution hole and having internally defined cooling features, in accordance with various embodiments.
Figure 3A:
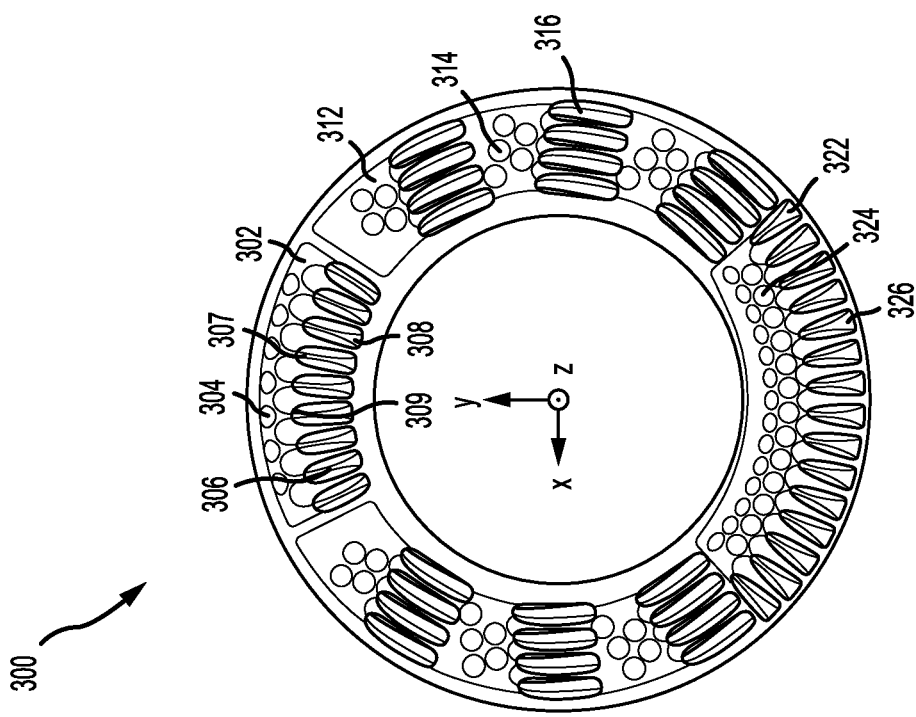
FIG. 3A illustrates a top view of a hot side of a grommet defining dilution hole with internally defined cooling features, in accordance with various embodiments.
Figure 3D:
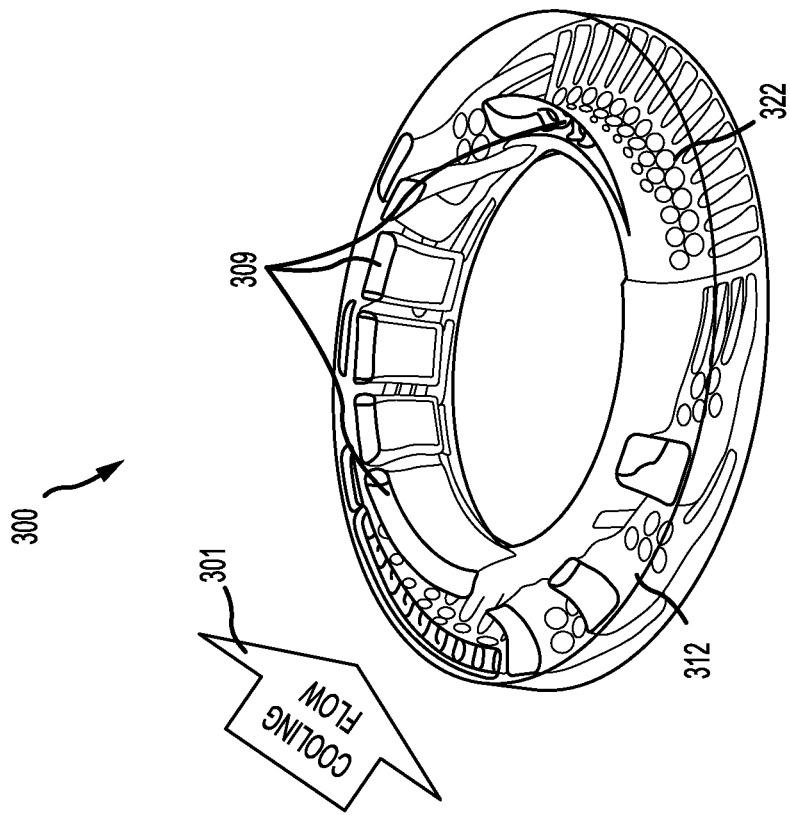
FIG. 3D illustrates a perspective-bottom view of a cold side of a grommet defining a dilution hole and having internally defined cooling features, in accordance with various embodiments.
Figure 3C:
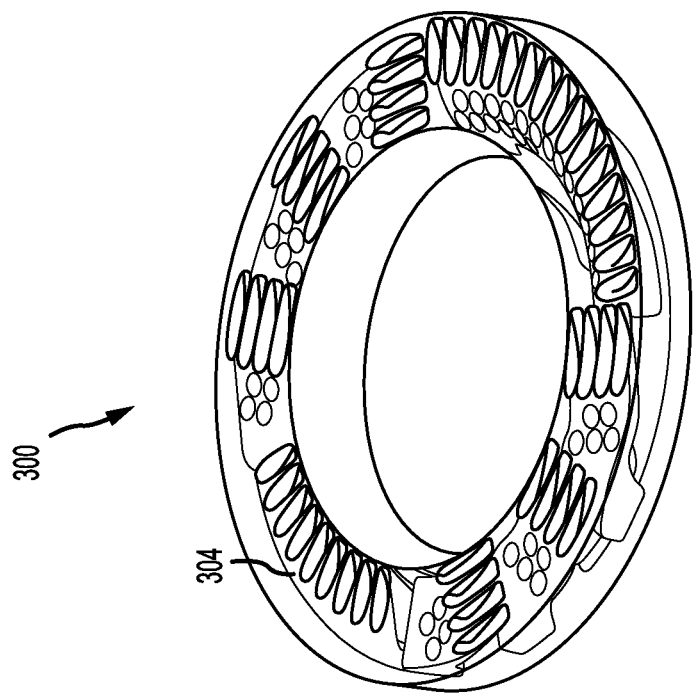
FIG. 3C illustrates a perspective-top view of hot side of a grommet defining a dilution hole and having internally defined cooling features, in accordance with various embodiments.
Figure 3E:
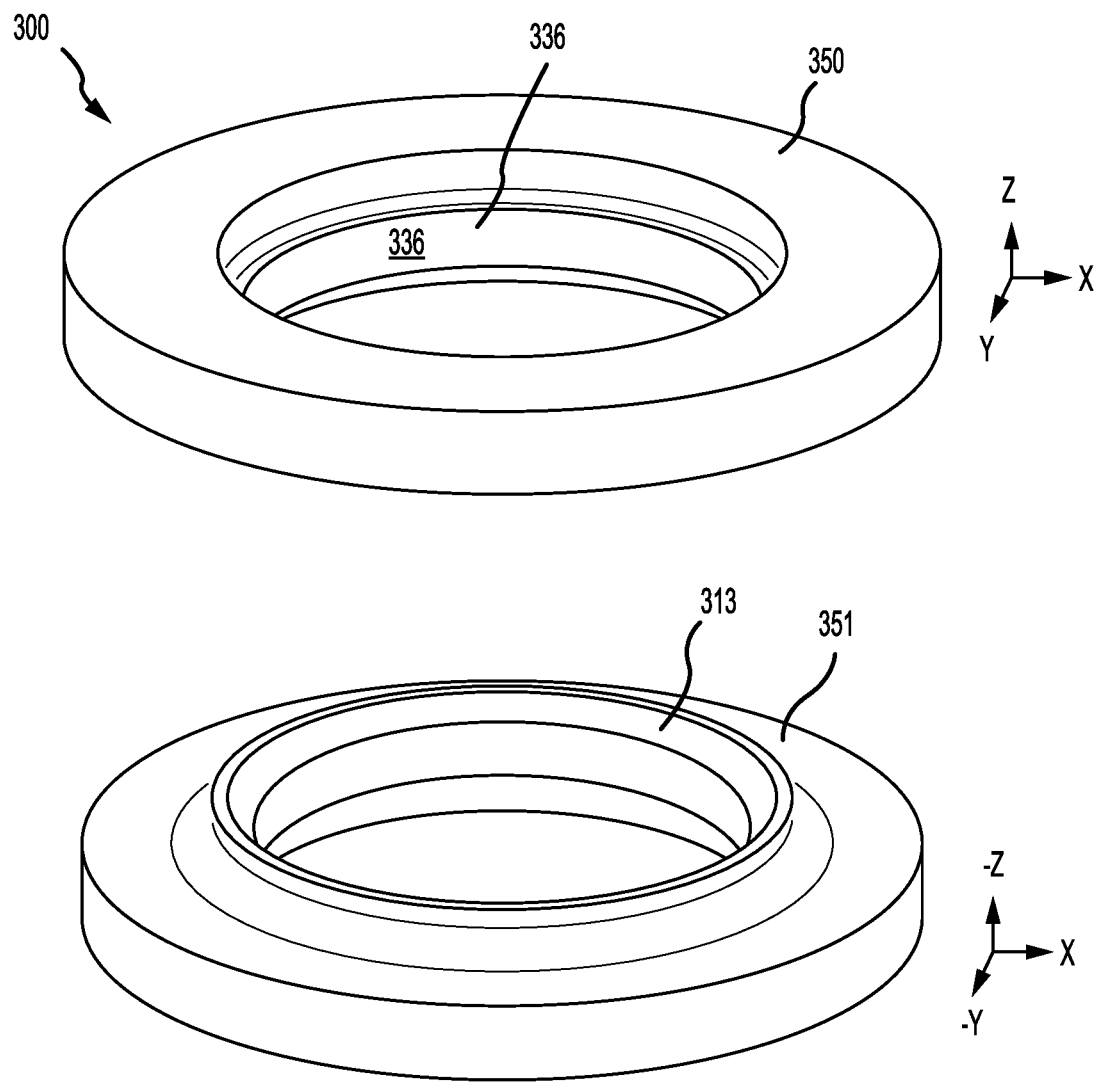
FIG. 3E illustrates perspective-top and perspective-bottom views of a grommet defining a dilution hole and having internally defined cooling features, in accordance with various embodiments.
Figure 3F:
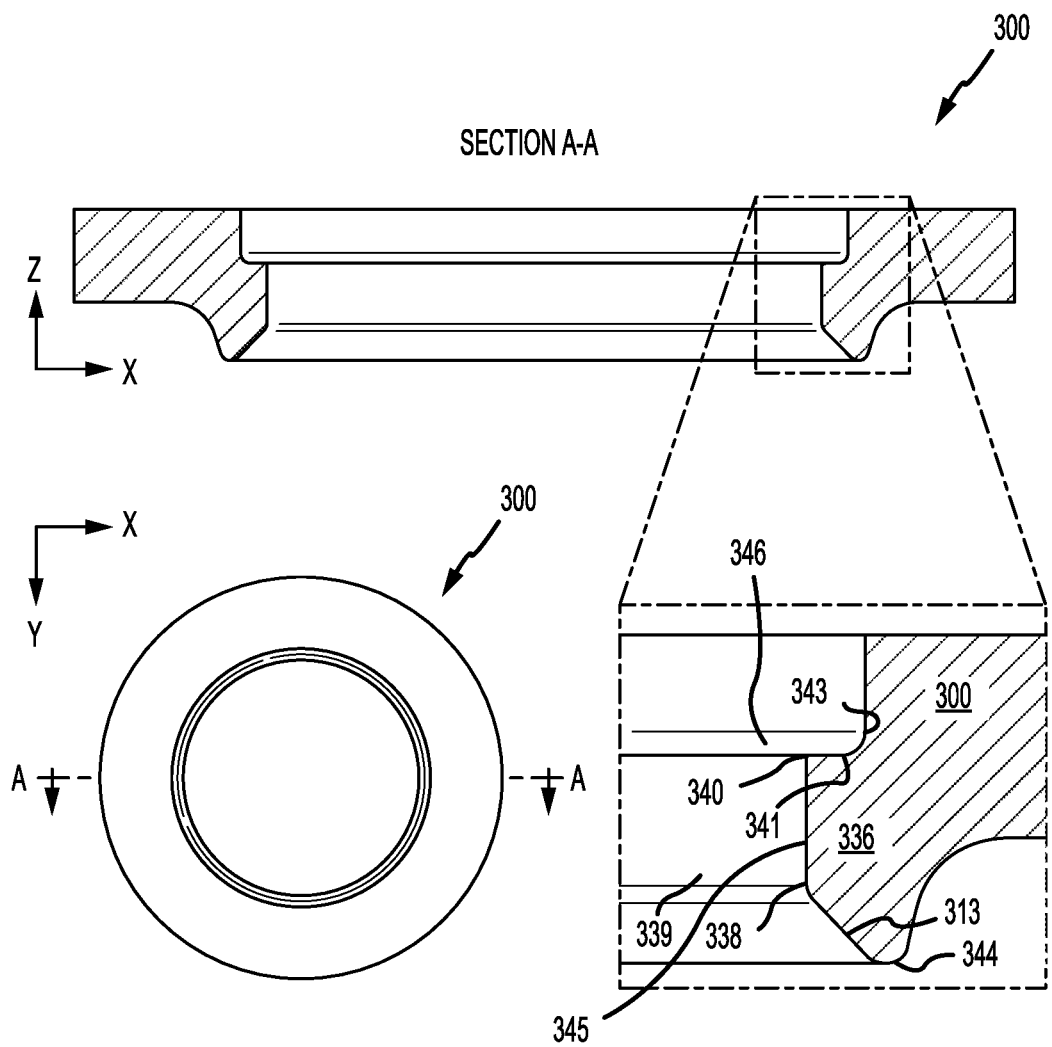
FIG. 3F illustrates a section through a grommet defining a dilution hole and having internally defined cooling features, in accordance with various embodiments.
Figures 1, 3F:
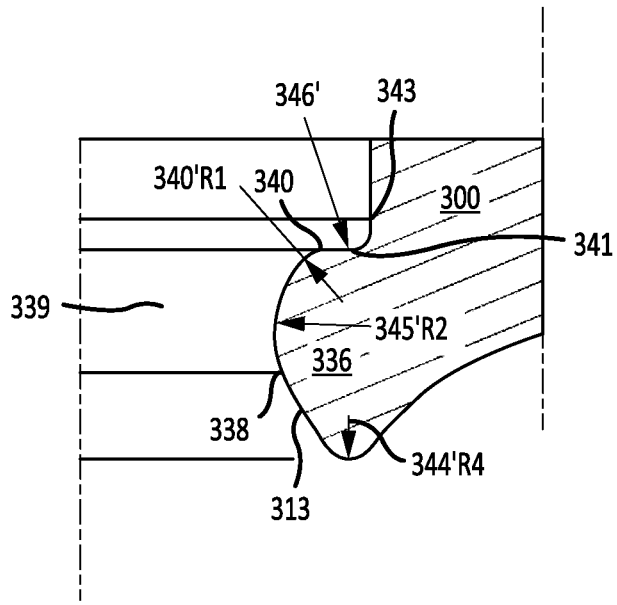
Figures 2, 3F:
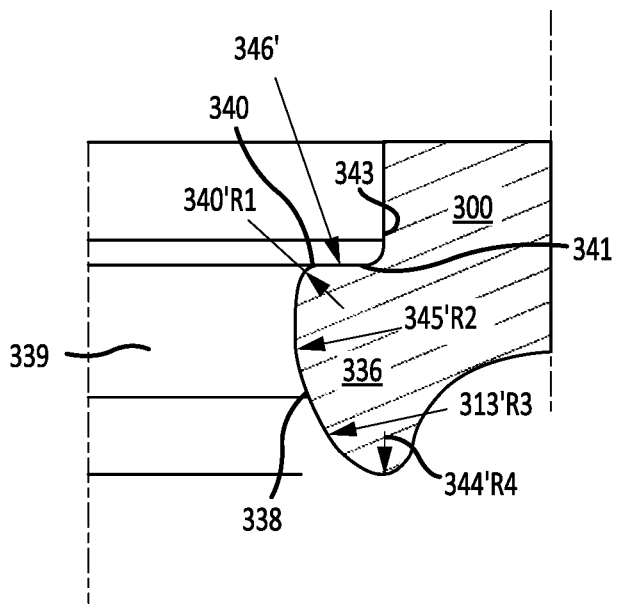

With reference now to FIGS. 3E and 3F, in various embodiments grommet 300 is shown with cooling features suppressed for clarity. XYZ-axes are provided for reference. A ridge 336 located relatively below (along the Z-axis) hot side 350 may be formed about inner diameter of grommet 300. In various embodiments, ridge 336 may and comprise ridge face 339 defining an inner diameter of a dilution hole, such as, for example, dilution hole 220, and an upper lip 340 and lower lip 338 defining a step 341 relatively below (along the Z-axis) hot side 350 and relatively above (along the Z-axis) cold side 351. In various embodiments, step 341 may have a step geometry 346 and ridge face 339 may have a ridge face geometry 345. In various embodiments, step 341 may comprise fillet 343. With additional reference to FIGS. 3F-1 and 3F-2, the inner diameter of grommet 300, the ridge face geometry 345 and the step geometry 346 may define a step having a sharp geometry (such as shown by 345 and 346 of FIG. 3F), a radial geometry, a multi-radial geometry (such as shown by 346', 340'R1, and 345'R2 of FIGS. 3F-1 and 3F-2), or other suitable shape to define ridge 336 between upper lip 340 and lower lip 338. In various embodiments, lower lip 338 is proximate bell-mouth 313 of grommet 300 which opens (along the X-axis) radially about the z-axis from the inner diameter toward cold side 351.

In various embodiments, bell-mouth 313 may have a curved geometry oriented about the inner diameter of grommet 300 and may incorporate simple and/or compound radii (such as compound radii 313'R3 and 344'R4 of FIG. 3F-2) bell-mouth fillet features around the circumference of the inner diameter of grommet 300 such as fillet 344. In various embodiments, bell-mouth 313 may have an increased length relative to non-curved inlet geometries. The curved surface of bell-mouth inlet 313 may reduce dilution hole inlet loss characteristics attributed to the sudden contraction and turning of the flow entering the dilution hole. Typical sharped edge dilution hole geometries may produce local wake shedding and flow separation along the leading edge of the inner diameter of the dilution hole. The separated flow region along the inner diameter of the dilution hole may also create a vena contracta, which also lowers the discharge coefficient of dilution hole. The term vena contracta describes the point in a fluid stream where the diameter of the stream is at a minimum, and thus fluid velocity is at a maximum.

Figure 3G:
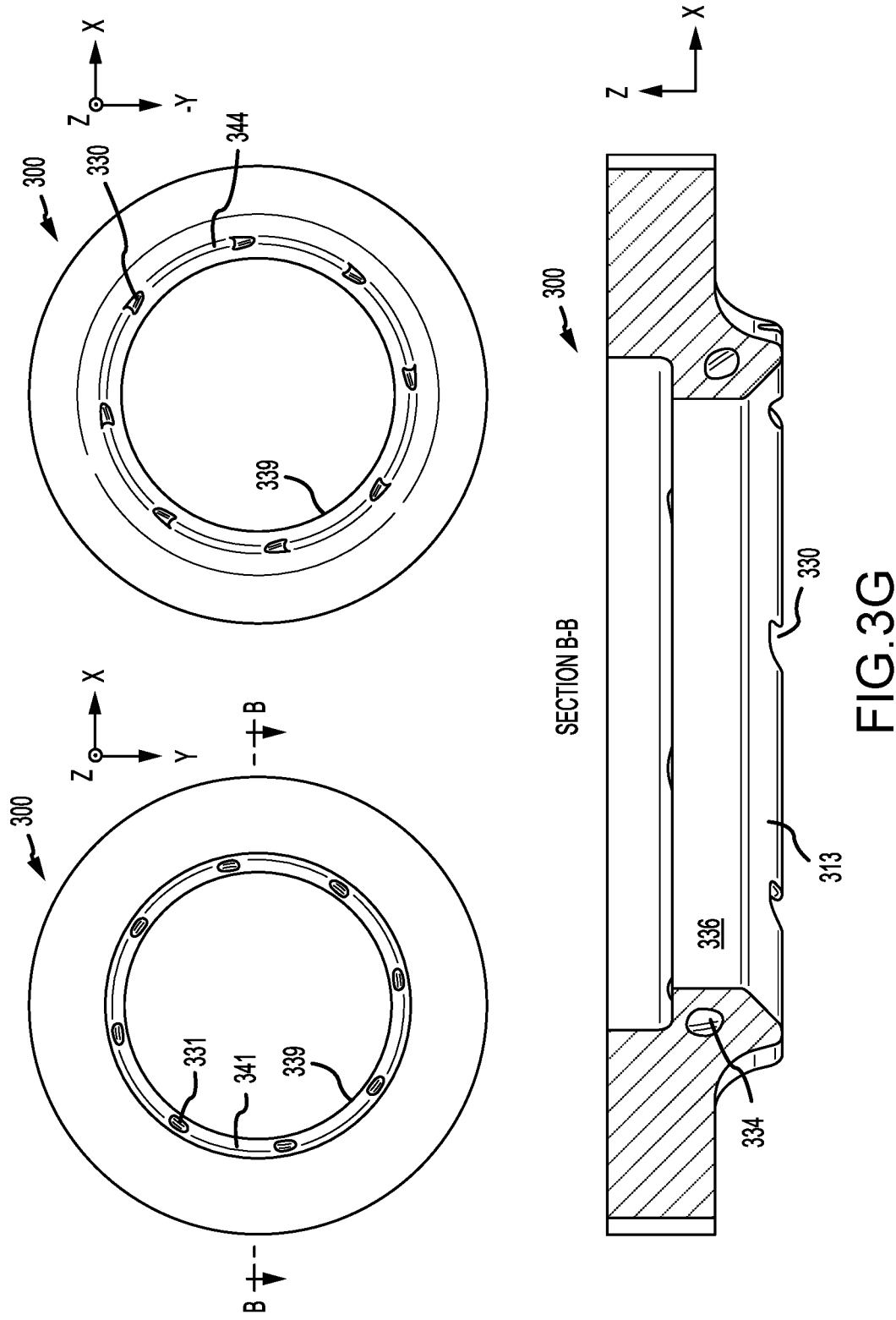
FIG. 3G illustrates top and bottom views of and a section through a grommet defining a dilution hole and having internally defined cooling features, in accordance with various embodiments.
Figures 1, 3G:
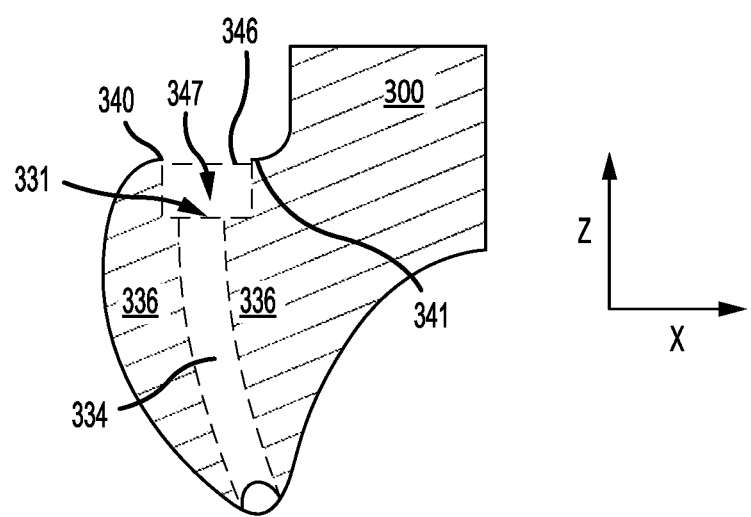
Figure 3H:
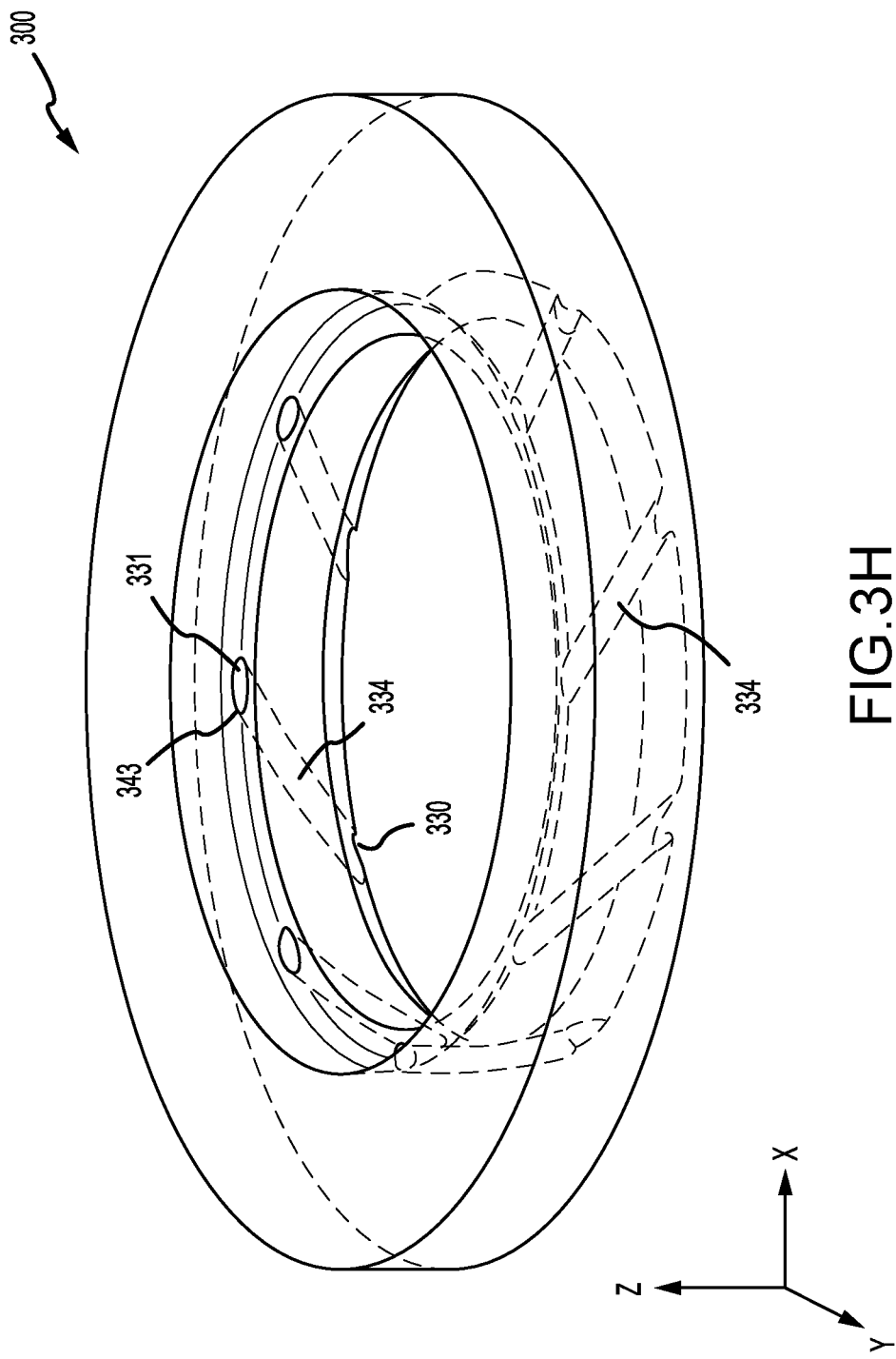
FIG. 3H illustrates perspective-top view of a grommet defining a dilution hole and having internally defined cooling features, in accordance with various embodiments.

With reference now to FIGS. 3G and 3H, in various embodiments grommet 300 is shown with cooling features, excepting circumferential swirl ridge cooling features, suppressed for clarity. XYZ-axes are provided for reference. Circumferential passage 334 spirals (about the Z-axis) internally through a solid portion of ridge 336 upward (along the Z-axis) beginning at inlet 330 and ending at outlet 331. Circumferential passage 334 passes cooling flow 301 taken from inlet 330 from the cold side to the hot side of ridge 336. Outlet 331 of circumferential passage 334 opens through step 341 and may open through fillet 343 and be configured to direct cooling flow along fillet 343 and around ridge 336 tending to fill the area with cool air and tending thereby to minimize entrainment of hot gas. In various embodiments, the geometry of outlet 331 may comprise a cylindrical, elliptical, diffused, and/or single lobe or multi-lobe geometry. Inlet 330 opens through bell-mouth 313 and may be cut across or open through fillet 344.

In various embodiments, and with additional reference to FIG. 3G-1, a cross section of a grommet grommet 300, is shown through ridge 336. Step 341 may comprise a trench feature 347 between fillet 343 and upper lip 340 cut into step 341 (along the Z-axis). Outlet 331 of circumferential passage 334 may open through base 352 of trench feature 347 tending to transport cooling flow in a predominately circumferential direction. In this regard, trench feature 347 may tend to create a continuous buffer of cooling flow which tends to mitigate the potential for hot gas entrainment due to flow separation occurring along an inner perimeter of a dilution hole. In various embodiments, outlet 331 may comprise a diameter $D_h$ defining the hydraulic diameter of outlet 331. In various embodiments, trench feature 347 may have a width (along the X-axis) of between $3D_h$ and $5D_h$, or between $2D_h$ and $4D_h$, or between $1D_h$ and $3D_h$. In various embodiments, trench feature 347 may have a depth (along the Z-axis) of between $0.5D_h$ and $4D_h$, or between $1D_h$ and $3D_h$, or between $1.5D_h$ and $2D_h$.

Figure 3I:
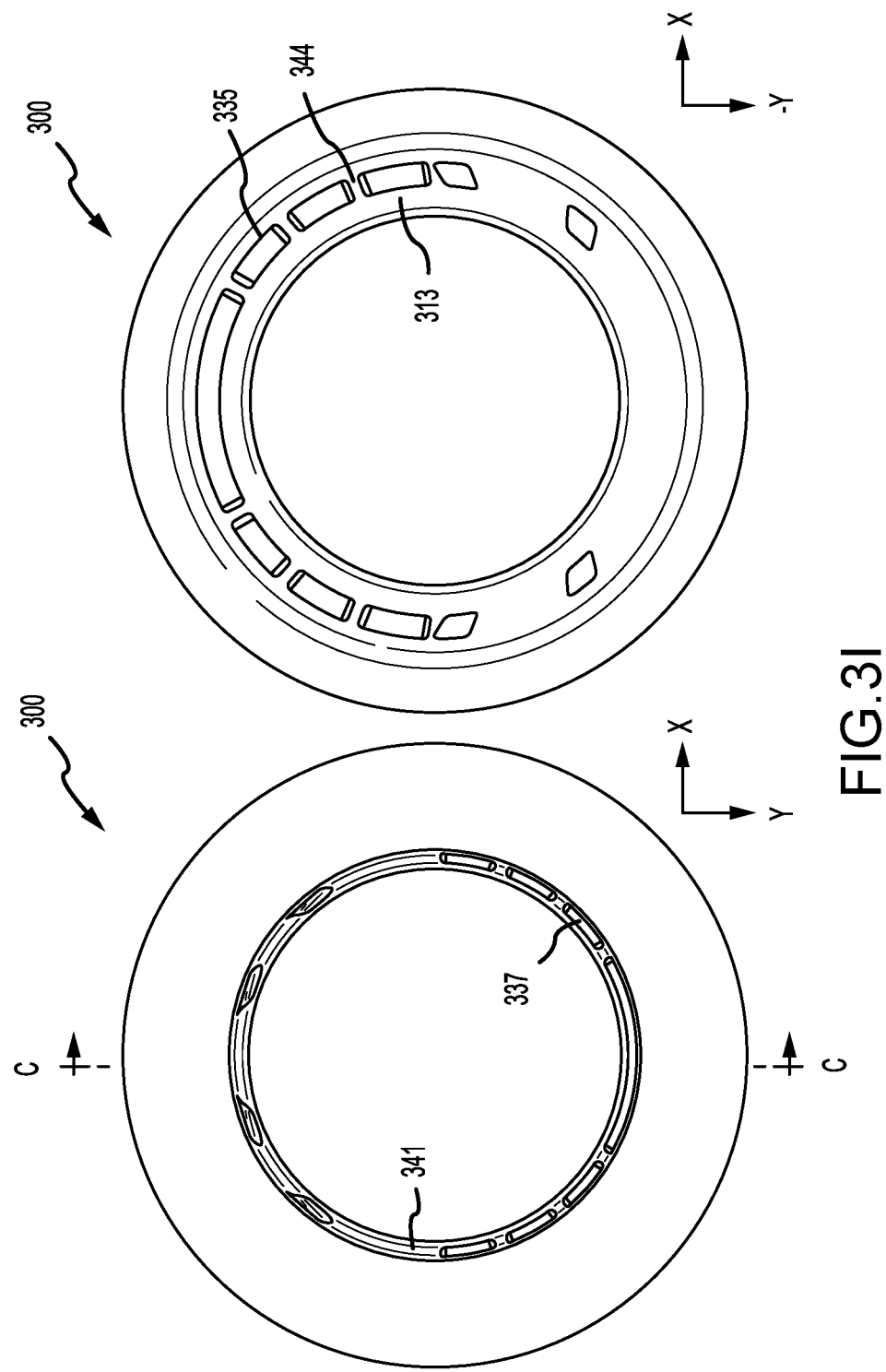
FIG. 3I illustrates top and bottom views of a grommet defining a dilution hole and having internally defined cooling features, in accordance with various embodiments.
Figure 3J:
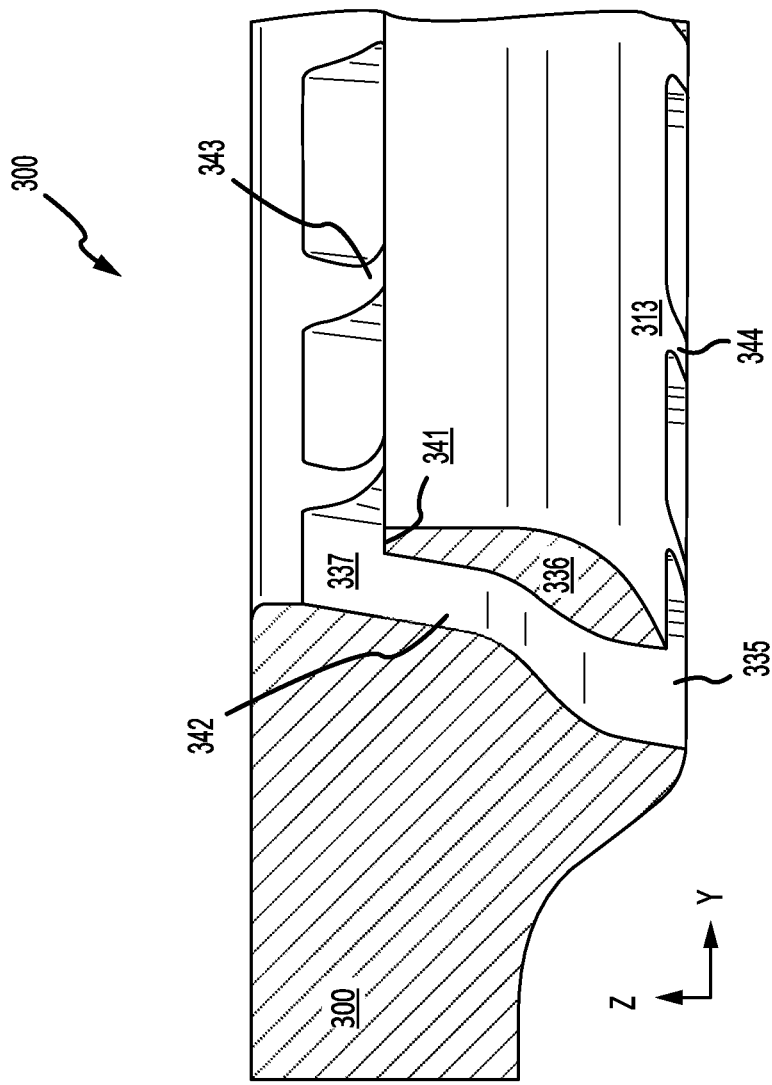
FIG. 3J illustrates a section through a grommet defining a dilution hole and having internally defined cooling features, in accordance with various embodiments.

With reference now to FIGS. 3I and 3J, in various embodiments grommet 300 is shown with cooling features, excepting radial injection ridge cooling features, suppressed for clarity and FIG. 3J shows a section of grommet 300 along line C-C. Xyz-axes are provided for reference. Axial passage 342 passes upward (along the z-axis) through a solid portion of ridge 336. In this regard, axial passage 342 may be substantially parallel to the axis of a dilution hole. The axial passage 342 passes cooling flow 301 taken from inlet 335 from the cold side to the hot side of ridge 336. Outlet 337 opens through step 341 and may open through fillet 343 and be configured to direct cooling flow radially inward of fillet 343 and ridge 336 toward the dilution hole tending to purge hot gas ingestion out of the recirculating area of the dilution hole. Inlet 335 opens through bell-mouth 313 and may be cut across or open through fillet 344.

In various embodiments, and with additional reference to FIGS. 3B and 3H, inner diameter cooling features, such as, for example, radial injection cooling features and circumferential ridge cooling features may incorporate discrete effusion and/or slot film cooling concepts. In addition, circumferential passage 334 and axial passage 342 may include discrete swirling effusion film cooling holes and/or continuous slot cooling. Passages may be incorporated into the stepped geometry of ridge 336 to mitigate inner diameter dilution jet flow separation and hot gas entrainment, which leads to increased local heat load and premature oxidation distress of dilution hole geometry.

Referring again to FIGS. 3A and 3B, in various embodiments, downstream cooling features 322 may include internal cooling features 324 formed prior to passages 326. Internal cooling features 324 may also be similar to internal cooling features 304, and passages 326 may also be similar to passages 306, with varied lengths, sizes, contours, hydraulic diameters, or other dimensions. Passages 326 may intake the cooling flow 301 at inlet 330.

In various embodiments, the geometry oxidation in grommet 300 may impact the design intent mass flux and momentum flux ratios which controls jet dilution hole jet spreading, penetration, and mixing. Changes in dilution hole geometry resulting from premature oxidation distress also can significantly influence the amount of local turbulent mixing that occurs in the lean region of the combustor and adversely impact design intent radial and circumferential gas temperature distributions resulting in reduced turbine durability capability and aero dynamic turbine efficiency and performance. Oxidation can also change the effective area of the dilution hole, causing more flow to enter the dilution hole than intended, which tends to reduce the pressure drop across the combustor. The grommets of the present disclosure tend to mitigate the local oxidation associated with dilution hole jet separation and recirculation and tend to mitigate the negative effects of hot gas entrainment resulting in local oxidation.

In various embodiments, cooling flow 301 may come from a high pressure feed source such as a cold-side coolant supply. Cooling flow may thus feed from high pressure diffuser source pressure in order to increase available pressure drop for cooling. By increasing available pressure drop available for cooling, pressure loss may be more effectively used to provide higher internal convective heat transfer cooling and increased convective surface area.

Referring now to FIG. 4, grommet 400 is shown, in accordance with various embodiments. Grommet 400 comprise features, geometries, construction, manufacturing techniques, and/or internal components similar to grommet 300 of FIGS. 3A-3J and dilution hole 220 of FIG. 2 but with varied arrangements of internal cooling features to balance cooling performance with the pressure drop across grommet 400. Grommet 400 may also include ridge 412 having passages 414 to direct cooling flow similar to ridge 336, circumferential passage 334, and axial passages 342 of FIGS. 3A-3J. Internal components in grommet 400 may be formed using additive manufacturing techniques with the pin fins 402 in downstream region 404 and/or upstream region 406 substantially aligned with the additive manufacturing build direction. Suitable additive manufacturing techniques may include direct metal laser sintering, selective laser sintering, selective laser melting, electron-beam melting, or electron-beam freeform fabrication. For combustor applications, diffusion holes may be made using a high-temperature capable alloy such as a nickel-based superalloy. In that regard, aligning pin fins 402 with the additive manufacturing build direction may simply involve aligning the filament build direction with the length of the pin fins 402. Other manufacturing techniques may be used either alone or in conjunction with additive manufacturing to generate features of grommet 400 such as investment casting. For example, laser drilling or electric discharge machining may be used for material removal to form cooling features and contours of grommet 400.

In various embodiments, passages 407 of grommet 400 may be joined by radial or multi-radial surfaces 408 that are arranged in predominately a circumferential orientation tending to segregate and/or meter the cooling flow between passages 407. The passages 407 may be of varying flow area between each of the surfaces 408. The resulting flow area of passages 407 may be of constant cross section and/or diffusing in the streamwise or radial Z-direction as coolant flow is discharged along the hot external surface. In various embodiments, managing the meter and exit area distribution of passage 407 tends to allow coolant flow and pressure loss to be tailored along the periphery of the dilution hole. In various embodiments, exit slot film discharge mass flow rate, mass flux ratio (blowing ratio), and momentum flux ratio may be configured to maximize a local film and thermal cooling effectiveness requirement. Pedestals 409 may be formed in rows of having similar diameters. For example, two pedestals 409 may be aligned along a substantially radial line of grommet 400. Three pedestals having a smaller diameter may be aligned along a second substantially radial line of grommet 400. In various embodiments, he pedestals may induce flow separation and wake shedding, tending thereby to create local flow vorticity, and tending to result in internal cavity pressure loss which in turn reduces the cooling mass flow rate entering passages 407.

Referring now to FIG. 5, grommet 500 is shown, in accordance with various embodiments. Grommet 500 includes heat transfer and pressure loss features, geometries, construction, and internal components similar to grommet 300 of FIGS. 3A-3J, dilution hole 220 of FIG. 2, and grommet 400 of FIG. 4, but with varied arrangements of internal cooling features to balance cooling performance with the pressure drop across grommet 500. Internal components in grommet 500 may be formed using additive manufacturing techniques in a manner similar to grommet 400. Grommet 500 may include downstream region 504 and upstream region 506 similar to downstream region 404 and/or upstream region 406 of FIG. 4. Grommet 500 may also include ridge 512 having passages 514 to direct cooling flow similar to ridge 336, circumferential passage 334, and axial passages 342 of FIGS. 3A-3J. In various embodiments, the leading edge slot discharge features 506 may be oriented in purely an axial direction parallel to the Y-axis, and/or may be oriented to provide more lateral spreading and diffusion of the slot exit film flow along the perimeter of the internal ridge 512, tending thereby to distribute a continuous boundary layer of insulating film along a greater length of the internal step 541 and tending to prevent hot gas entrainment due to local flow separation within the inner diameter surface of the ridge 536 dilution hole. In various embodiments, the trailing edge slot discharge features 515 may be oriented in a purely axial direction parallel to the Y-axis, and/or may be oriented to such that the slot exit film flow tends to converge and, in response to the slot exit film flow tends to convergence, creating a superposition effect tending to mitigate external hot side gas path vortices formed downstream of the dilution hole jet.

Grommet 500 may also include perimeter region 508 that includes convective cooling passage 510 and internal cooling features 509. Convective cooling passage 510 may be a length of passage lacking pedestals and smaller passages. Convective cooling passage 510 may extend from inner diameter of grommet 500 to outer diameter of grommet 500 in a radial direction. Internal cooling features 509 may begin approximately at the mid-point between upstream region 506 and downstream region 504. Internal cooling features 509 may then extend to outlet passages 511.

Figure 6:
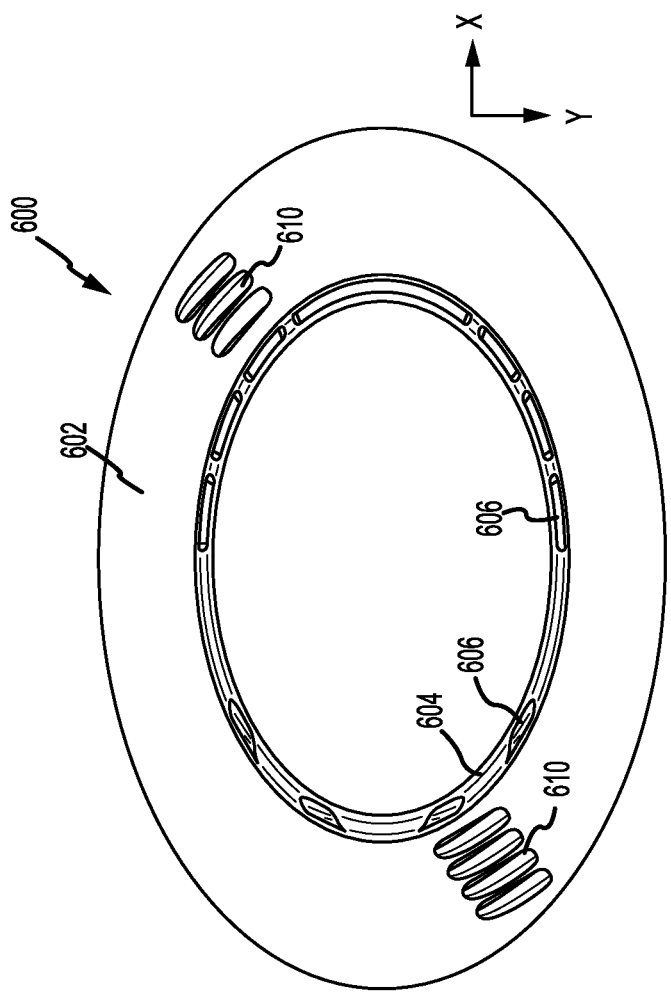
FIG. 6 illustrates a grommet having an elliptical geometry defining a dilution hole, in accordance with various embodiments.

Referring now to FIG. 6, grommet 600 is shown, in accordance with various embodiments. Grommet 600 includes heat transfer and pressure loss features 610, geometries, construction, and internal components similar to grommet 300 of FIGS. 3A-3J, dilution hole 220 of FIG. 2, grommet 400 of FIG. 4, and/or grommet 500 of FIG. 5 but with varied arrangements of internal cooling features to balance cooling performance with the pressure drop across grommet 600. Internal components in grommet 600 may be formed using additive manufacturing techniques in a like manner. Grommet 600 has elliptical geometry 602 and may also include ridge 604 having passages 606 to direct cooling flow similar to ridge 336, circumferential passage 334, and axial passages 342 of FIGS. 3A-3J.

In various embodiments, grommet 300 of FIGS. 3A-3J, dilution hole 220 of FIG. 2, grommet 400 of FIG. 4, grommet 500 of FIG. 5, and grommet 600 of FIG. 6 (referred to collectively as "illustrated dilution holes of the present disclosure") are illustrated and described for exemplary purposes. Features of the illustrated dilution holes of the present disclosure may be used in any combination with one another in various embodiments comprising similar features. Illustrated dilution holes of the present disclosure may increase thermal performance at lower flow levels and thus enable redistribution of cooling to other locations of combustor panels for improved durability and combustor performance. Illustrated diffusion holes of the present disclosure may also improve combustor module durability to extend engine-component life. Additive manufacturing technology may also enable generation of diffusion holes and liners to directly produce finished combustor panels with the convective and effusion cooling formed integrally within.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A grommet having an annular geometry inserted into a dilution hole of a combustor liner, the annular geometry comprising an inner diameter and an outer diameter of the grommet, the grommet being coupled to the combustor liner, wherein the inner diameter of the grommet defines an inner diameter of the dilution hole, the grommet comprising:

a ridge having a step geometry comprising at least one of
a sharp geometry, a radial geometry, or a multi-radial
geometry, the ridge formed about the inner diameter of
the grommet and comprising a plurality of passages,
wherein:
the ridge projects radially inward from an inner diameter wall of the grommet and defines a step,
the step is defined by the step geometry and a ridge face geometry,
the ridge face geometry comprises the at least one of the sharp geometry, the radial geometry, or the multi-radial geometry,
each passage in the plurality of passages spirals through a solid portion of the ridge axially and circumferentially about the dilution hole,
each passage in the plurality of passages begins at an inlet disposed on a cold side of the ridge and ends at an outlet on a hot side of the ridge,
the outlet opens through a fillet of the ridge,
each passage in the plurality of passages is spaced apart circumferentially an adjacent passage in the plurality of passages, and
the plurality of passages are configured to direct cooling flow around the ridge to at least partially fill the ridge with cool air, wherein the fillet is disposed about the inner diameter of the grommet, wherein the outlet is configured to direct the cooling flow radially inward of the fillet and the ridge toward the dilution hole.

2. The grommet of claim 1, wherein the grommet further comprises a bell-mouth comprising a second fillet, wherein the inlet opens through one of the bell-mouth or the second fillet.

3. The grommet of claim 1, wherein the inner diameter of the annular geometry is between ⅛ inch (3 mm) and 1 inch (25 mm), the outer diameter is between ¼ inch (6 mm) to 1.5 inches (38 mm).

4. The grommet of claim 3, wherein the annular geometry comprises a thickness between 100 thousandths of an inch (2.5 mm) and 500 thousandths of an inch (1 cm).

5. A combustor liner comprising:
an array of cooling holes defined by the combustor liner; and
a grommet having an annular geometry comprising an inner diameter and an outer diameter of the grommet, the grommet formed integrally with the combustor liner and defining a dilution hole, wherein the inner diameter of the grommet defines an inner diameter of the dilution hole, wherein the grommet comprises:
a ridge having a step geometry comprising at least one of a sharp geometry, a radial geometry, or a multi-radial geometry, the ridge formed about the inner diameter of the grommet and comprising a plurality of passages, wherein:
the ridge projects radially inward from an inner diameter wall of the grommet and defines a step,
the step is defined by the step geometry and a ridge face geometry,
the ridge face geometry comprises the at least one of the sharp geometry,
the radial geometry, or the multi-radial geometry,
each passage in the plurality of passages spirals through a solid portion of the ridge axially and circumferentially about the dilution hole,
each passage in the plurality of passages begins at an inlet disposed on a cold side of the ridge and ends at an outlet on a hot side of the ridge,
the outlet opens through a fillet of the ridge,
each passage in the plurality of passages is spaced apart circumferentially an adjacent passage in the plurality of passages,
the plurality of passages are configured to direct cooling flow around the ridge to at least partially fill the ridge with cool air,
the fillet is disposed about the inner diameter of the grommet, and
the outlet is configured to direct the cooling flow radially inward of the fillet and the ridge toward the dilution hole.

6. The combustor liner of claim 5, wherein:
the inner diameter of the annular geometry is between ⅛ inch (3 mm) and 1 inch (25 mm), and
the outer diameter of the annular geometry is between ¼ inch (6 mm) to 1.5 inches (38 mm).

7. A gas turbine engine comprising:
a compressor section configured to compress a gas;
a combustor section aft of the compressor section and configured to combust the gas, wherein the combustor section comprises a combustor liner having a grommet formed integrally with the combustor liner, having one of an annular geometry or an elliptical geometry and defining a dilution hole, the annular geometry or the elliptical geometry comprising an inner diameter and an outer diameter of the grommet, wherein the inner diameter of the grommet defines an inner diameter of the dilution hole; and
a turbine section aft of the combustor section and configured to extract energy from the gas, wherein the grommet comprises:
a ridge having a step geometry comprising at least one of a sharp geometry, a radial geometry, or a multi-radial geometry, the ridge formed about the inner diameter of the grommet and comprising a plurality of passages, wherein:
the ridge projects radially inward from an inner diameter wall of the grommet and defines a step,
the step is defined by the step geometry and a ridge face geometry,
the ridge face geometry comprises the at least one of the sharp geometry,
the radial geometry, or the multi-radial geometry,
each passage in the plurality of passages spirals through a solid portion of the ridge axially and circumferentially about the dilution hole,
each passage in the plurality of passages begins at an inlet disposed on a cold side of the ridge and ends at an outlet on a hot side of the ridge,
the outlet opens through a fillet of the ridge,
each passage in the plurality of passages is spaced apart circumferentially an adjacent passage in the plurality of passages,
the plurality of passages are configured to direct cooling flow around the ridge to at least partially fill the ridge with cool air,
the fillet is disposed about the inner diameter of the grommet, and
the outlet is configured to direct the cooling flow radially inward of the fillet and the ridge toward the dilution hole.

8. The gas turbine engine of claim 7, wherein:
the inner diameter of the annular geometry or the elliptical geometry is between ⅛ inch (3 mm) and 1 inch (25 mm), and the outer diameter of the annular geometry or the elliptical geometry is between ¼ inch (6 mm) to 1.5 inches (38 mm).

* * * * *

UNITED STATES PATENT AND TRADEMARK OFFICE
CERTIFICATE OF CORRECTION

| | |
|---|---|
| PATENT NO. | : 12,050,011 B2 |
| APPLICATION NO. | : 17/466999 |
| DATED | : July 30, 2024 |
| INVENTOR(S) | : Dominic Mongillo, Jr. |

It is certified that error appears in the above-identified patent and that said Letters Patent is hereby corrected as shown below:

On the Title Page

At (72) Inventors: after "Tracy" please delete "Phropheter-Hinckley" and insert --Propheter-Hinckley--

Signed and Sealed this
Twelfth Day of November, 2024

Katherine Kelly Vidal
*Director of the United States Patent and Trademark Office*